(12) United States Patent
Moller et al.

(10) Patent No.: US 7,588,371 B2
(45) Date of Patent: Sep. 15, 2009

(54) BEARING ASSEMBLY

(75) Inventors: Rainer Moller, Stammheim (DE); Jan Georgi, Niederwern (DE); Josef Zylla, Schonungen (DE)

(73) Assignee: Schaeffler KG, Herzogenaurach (DE)

( * ) Notice: Subject to any disclaimer, the term of this patent is extended or adjusted under 35 U.S.C. 154(b) by 374 days.

(21) Appl. No.: 10/596,225

(22) PCT Filed: Nov. 25, 2004

(86) PCT No.: PCT/DE2004/002596

§ 371 (c)(1),
(2), (4) Date: Aug. 30, 2006

(87) PCT Pub. No.: WO2005/057031

PCT Pub. Date: Jun. 23, 2005

(65) Prior Publication Data

US 2007/0172165 A1   Jul. 26, 2007

(30) Foreign Application Priority Data

Dec. 6, 2003   (DE) .............................. 103 57 109

(51) Int. Cl.
   *F16C 19/49*   (2006.01)
(52) U.S. Cl. ................... 384/454; 384/494; 384/906
(58) Field of Classification Search ......... 384/452–455, 384/494, 493, 557, 504, 517, 906; 418/201.1, 418/206.7
See application file for complete search history.

(56) References Cited

U.S. PATENT DOCUMENTS

| | | | | | |
|---|---|---|---|---|---|
| 1,491,992 | A | * | 4/1924 | McCuen | 384/454 |
| 3,388,854 | A | * | 6/1968 | Olofsson et al. | 418/203 |
| 3,738,719 | A |   | 6/1973 | Langner | |
| 4,244,630 | A | * | 1/1981 | Tischer | 384/494 |
| 4,465,446 | A | * | 8/1984 | Nemit et al. | 384/588 |
| 4,557,679 | A | * | 12/1985 | Mori et al. | 384/585 |
| 4,730,995 | A | * | 3/1988 | Dewhirst | 418/201.1 |
| 5,159,742 | A | * | 11/1992 | Winter | 384/906 |
| 5,382,099 | A | * | 1/1995 | Bauer et al. | 384/454 |
| 5,975,867 | A | * | 11/1999 | Grant et al. | 418/201.1 |

FOREIGN PATENT DOCUMENTS

| | | |
|---|---|---|
| DE | 23 01 204 A | 10/1973 |
| DE | 38 11 970 X | 10/1989 |

* cited by examiner

Primary Examiner—Thomas R Hannon
(74) Attorney, Agent, or Firm—Lucas & Mercanti, LLP

(57) ABSTRACT

The invention relates to a bearing assembly (1) comprising at least one first bearing (6) that acts as an axially free radial support (5) and at least one second bearing (8) that acts as a radially free axial support (7). According to the invention, said bearings (6,8) share a common rotational axis (19) and at least one first bearing ring (9) of the first bearing (6) and a second bearing ring (10) of the second bearing (8) are rotationally fixed in relation to at least one bearing seat.

8 Claims, 2 Drawing Sheets

BEARING ASSEMBLY

FIELD OF THE INVENTION

The invention relates to a bearing assembly with at least one first bearing as an axially free radial support and with at least one second bearing as a radially free axial support, the bearings having a common axis of rotation and at least a first bearing ring of the first bearing and a second bearing ring of the second bearing being rotationally fixed in relation to at least one bearing seat.

BACKGROUND OF THE INVENTION

Bearing assemblies of this type are intended for the radial and axial mounting of shafts in a housing or of housings on a shaft. In this invention, shafts are understood as meaning all conceivable machine elements, such as driven and driving shafts/shaft ends, axles and consequently also the shaft shoulders on rotating components of compressors in machine systems. Bearing seats are all seats of bearings in/on housings or in/on shafts. Housings are all conceivable machine parts or systems which are mounted rotatably in relation to or on the shaft by means of the bearing assembly or in/on which the shafts are mounted by means of the bearing assemblies.

Axially free radial supports are bearings which either, on account of their design features, support only against radial forces/radial force components or bearings which, although also designed for receiving forces acting obliquely in relation to the bearing axis or for receiving axial forces, in particular applications are only to support against radial forces for a wide variety of reasons.

Radially free axial supports are bearings which either, on account of their design features, support only against axial forces/axial force components or bearings which, although also designed for receiving forces acting obliquely in relation to the bearing axis or for receiving radial forces, in particular applications are only to support against axial forces for a wide variety of reasons.

Bearing assemblies of this type are to be found in compressors, for example in screw-type compressors. In this bearing assembly, at least one bearing receives the radial forces and thereby rotatably supports for example the shank of a rotor against a housing. As radial supports, for example cylindrical or needle roller bearings or ball bearings are used. Also provided in the bearing assembly is at least one axial support, by means of which axial force components, occurring for example during compression, are received on the rotors. Examples of bearings of this type are ball bearings of a four-point bearing configuration and angular ball bearing configurations or tapered roller bearings.

One of the bearing assemblies is described in U.S. Pat. No. 5,975,867. The bearing assembly is formed in each case by a tapered roller bearing and a radial needle bearing. The radial needle bearing is an axial movable bearing. The tapered roller bearing is in this case exclusively intended for receiving axial forces/axial force components that are directed in the same direction as the axis of rotation of the bearing assembly. The outer rings of the two bearings considered are both respectively held in a rotationally fixed manner on a housing of the compressor. For this purpose, the outer ring of the needle bearing is pressed into a bore. The outer ring of the tapered roller bearing is rotationally fixed in relation to the housing in a form-locking manner by means of a pin. The inner rings of the bearing are seated on a shaft in a fixedly prestressed manner.

There are also known bearing assemblies in which the means for rotational securement are rotationally secured by clamping the rings against a housing or against other bearing rings in an axial force-locking manner. Alternatively, the bearing rings are secured by force locking from friction or by form locking by means of securing elements in a bore of the housing. Examples of such means for rotational securement are O-rings radially deformed between an outer ring and a bearing bore or radially deformed between a shaft and an inner ring, and consequently radially prestressing O-rings. Also used are pins and the like, which engage in a form-locking manner simultaneously in end-face recesses/bores in the bearing ring to be secured and in the housing to be secured.

The effort involved in preparing the bearing seats, for example in a housing, and in the installation of the bearing assemblies according to the prior art is relatively high. For example, the corresponding clearances/recesses for the engagement of the securing elements such as pins and O-rings must be made in the housings. During installation, the bearing rings must then be aligned precisely in such a way that the connecting elements can enter exactly into the corresponding clearances.

SUMMARY OF THE INVENTION

The object of the invention is therefore to provide a bearing assembly with which the effort involved in preparing the means for rotational securement, for example in preparing a housing seat for the bearing assembly, and in the installation of the bearing assembly in the system is reduced.

This object is achieved in the case of the subject matter of the characterizing clause of claim 1 in that the first bearing ring and the second bearing ring lie axially opposite each other and the second bearing ring is thereby coupled with the first bearing ring, contactlessly in relation to the bearing seat, in a locking/rotationally fixed manner. The bearing ring of the radial support and a bearing ring of the axial support are in contact with each other axially, at least in certain portions, or lie axially opposite, separated from each other by an axial gap. Axial means here directed in the same direction as the axis of rotation. The bearing rings are coupled in a locking manner with each other in the direction of rotation about the axis of rotation at the portion or at the portions at which they lie axially against each other. The supports are separated from each other for example by disks or other machine elements, the bearing rings in this case engaging over these machine elements. However, the axial support is preferably arranged in the bearing assembly directly next to the radial support. In this case, for example, the outer rings and/or the inner rings of the supports are in contact at their end faces or are at least axially opposite each other. The outer rings or the inner rings of the supports are directly in engagement with each other in a locking manner or are connected to each other in a locking manner by means of a connecting element. Alternatively, an outer ring or inner ring of the radial support is coupled with an axial disk of an axial support configured as an axial rolling bearing.

The bearing assembly has either one or more of the radial supports. One or more of the radial supports is axially adjoined on one or both sides respectively by one or more of the axial supports on the axis of rotation. The respective axial support, coupled with a radial support, is alternatively adjoined optionally again by a radial support or by a further axial support, and so on. The axially successive supports are coupled with one another. It is conceivable that on a radial support which is arranged axially between two axial supports, a bearing ring of each of the two axial supports is respectively secured against rotation on the radial support.

The bearing ring of the radial support is preferably fixed in relation to the bearing seat by means of a press fit. By contrast with the previously known prior art, the bearing ring of the axial support is not rotationally secured on the bearing seat, but is held in a rotationally fixed manner in relation to the bearing seat only by a locking means with the radial support. In this case, the bearing ring of the axial support is arranged contactlessly in relation to the bearing seat, with which the bearing ring of the radial support is coupled against relative contortion. Use of a bearing assembly according to the invention dispenses with grooves, bores or the like, which were previously provided in prior-art assemblies for the engagement of the means for rotational securement.

By means of suitable elements on the bearing rings, such as the pairings of radially or axially protruding projections, the bearing rings are in engagement with corresponding recesses in the bearing rings. Alternatively and with preference in this respect, however, the bearing ring of the radial support is coupled in a locking manner with the bearing ring of the axial support by means of at least one connecting element that is separate from the bearing rings. The connecting element engages in a locking manner in a corresponding clearance on the bearing ring of the radial support and simultaneously in a corresponding recess on the bearing ring of the axial support.

With the invention, a number of the connecting elements for the form-locking coupling of two bearing rings are also provided. A number of connecting elements are arranged circumferentially with equal or unequal spacing from one another. The connecting element, for example a feather key, is placed in an axially divided feather key groove. An axial portion of the groove is respectively formed on one of the rings, so that the axially successive portions of the groove form the feather key groove. Flat keys are further connecting elements. The use of pins as connecting elements is also conceivable. The pins are either fitted into corresponding axial bores of the coupled-together bearing rings or are placed into axial or radial-axial recesses of the bearing rings to be coupled.

The connecting element is preferably a Woodruff key. Woodruff keys are, for example, components standardized by the German industry standard (DIN) No. 6888. These components have a crescent-shaped cross section along the axis of rotation of the bearing assembly and a rectangular cross section transversely in relation to the axis of rotation. The bearing rings to be secured have in each case one or more holding grooves (for example end grooves) that are shaped as desired or, optionally, are likewise of standardized dimensions and correspond to the outside dimensions of the Woodruff key. A Woodruff key respectively engages axially and radially in two of the holding grooves aligned in relation to each other.

The bearing seat is preferably a bore in the housing. The bearing ring of the radial seat is accommodated in the bore in a rotationally fixed manner in relation to the housing. The bearing ring of the axial support is either arranged outside the bore or axially enters the bore partially or completely. If the bearing ring of the axial support axially engages fully or partially in the bore, the bearing ring is radially surrounded by an air gap in the bore. The bearing ring of the axial support is consequently arranged freely in relation to the bearing seat and cannot be loaded in the radial direction.

The bore is described around the first bearing ring and around the second bearing ring by an inside diameter that is the same throughout. Such an arrangement has the advantage that the bore can be drilled, reamed or ground without complex machining. In this case, the greatest outside diameter of the bearing ring on the axial support must be less than the smallest possible outside diameter of the bearing ring on the radial support.

As an alternative to the previously described variant, the bore is described at least in certain portions by inside diameters varying in size. The bore has in this respect at least a first portion and a second portion. In the first portion, the bearing ring of the radial support enters at least partially. In the second portion, the bearing ring of the axial support enters at least partially. The first portion has an inside diameter which is either less than or greater than the inside diameter of the second portion. The bearing bore optionally leads through two housing portions that are axially separate from each other or lie axially against each other.

The radial and/or axial supports are optionally sliding bearings, in which case the bearing rings being sliding rings. However, the supports are preferably rolling bearings with in each case at least one bearing ring and rolling bodies.

The invention avoids complex machining operations, such as the cutting or broaching of grooves or the like on the bearing supports for the form-locking engagement of connecting/securing elements. Engagement grooves are for example simply made in hardened and/or unhardened bearing rings. There is no longer any need for complex finishing work on the bearing rings. There is no longer any need for the exact installation of the bearings with the connecting elements into a bore, for example, since the connecting elements no longer have to engage in a form-locking manner in corresponding recesses of the bore and radially protrude beyond the outside diameter of the bearing seat at most by a radial dimension that is less than the inside radius of the bore.

BRIEF DESCRIPTION OF THE DRAWINGS

The invention is explained in more detail below on the basis of exemplary embodiments. In the drawing specifically.

DETAILED DESCRIPTION OF THE DRAWINGS

Figure 1:
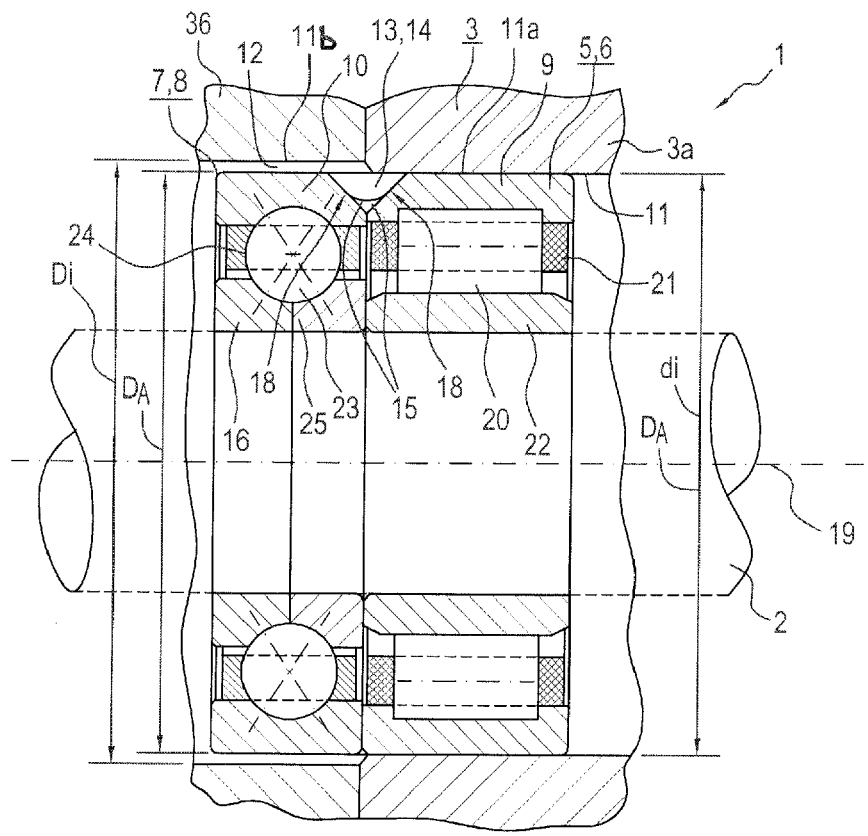
FIG. 1 shows a longitudinal section through a bearing assembly with a radial support configured as a roller bearing and an axial support configured as a four-point bearing.
Figure 2:
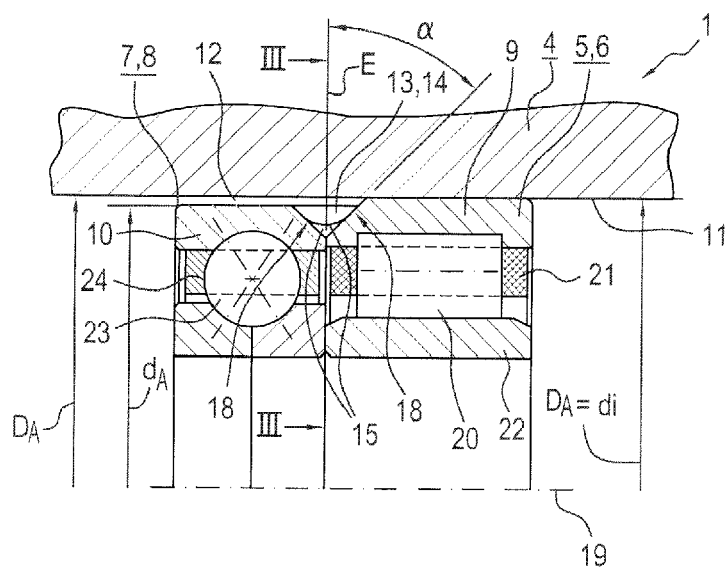
FIG. 2 shows the bearing assembly as shown FIG. 1 in another housing.

FIGS. 1 and 2 show a bearing assembly 1 for the radial and axial mounting of a shaft 2 in a housing 3 or in a housing 4, respectively. The bearing assembly 1 has a bearing 6 formed as a radial support 5, in the form of a roller bearing, and a bearing 8 acting as an axial support 7, in the form of a four-point bearing. The bearing assembly 1 supports rotors (not represented) of a screw-type compressor.

An outer bearing ring 9 of the radial support 5 lies axially opposite an outer bearing ring 10 of the axial support 7. The bearing ring 9 is pressed into the bore 11, formed as a bearing seat, and is consequently rotationally secured in relation to the housing 3 or 4, respectively. The bearing ring 10 is separated from the housing 3 by an air gap 12 and is consequently arranged contactlessly in relation to the bearing seat.

The bearing rings 9 and 10 are coupled to each other by means of a separate connecting element 13 in the form of a Woodruff key 14 in the direction of rotation about the axis of rotation 19. In the representation of FIG. 1 and FIG. 2, the Woodruff key 14 is designed in a crescent-shaped manner and, as FIG. 3 reveals, has a rectangular cross section. Respectively formed on the first and second bearing rings is a holding groove 15, which extends radially from outside and axially from one of the end faces of the respective bearing ring 9, 10 into the bearing ring 9, 10.

Figure 3:
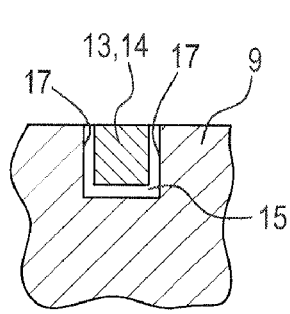
FIG. 3 shows a representation of a detail along the section III-III from FIG. 2 that is enlarged and not to scale and FIGS. 4 to 6 show rolling bearings in various configurations with designs of holding grooves on one of the bearing rings.

As FIG. 3 reveals, the side walls 17 of the holding groove 15 are aligned parallel to each other, transversely in relation to the axial direction, and the axially facing side walls 18 of the holding grooves 15 are inclined at an angle α of 40° to 45° in relation to one another from radial plane E passed through perpendicularly by the axis of rotation 19.

The bore 11 as shown FIG. 1 has two portions 11a and 11b. The portion 11a is formed on a housing part 3a. The axial support 7 is radially separated in the portion 11b from a housing part 3b by the air gap 12. The housing parts 3a and 3b are axially fixed against each other. The outside diameters $D_A$ of the radial support 5 and the axial support 7 are at least approximately equal in size. The inside diameter $d_I$ of the portion 11a is less than the inside diameter $D_i$ of the portion 11b.

FIG. 2 shows the bearing assembly 1, in which the bore 11 has an equal inside diameter $D_i$ over the radial support 5 and over the axial support 7. The outside diameter $D_A$ of the bearing 6 corresponds to the inside diameter $d_i$ of the bore 11. The outside diameter $d_A$ of the bearing 8 is less than the outside diameter $D_A$ of the bearing 6.

The bearings 6 and 8 are rolling bearings. The bearing 6 comprises the bearing ring 9, rollers 20, a cage 21 and an inner ring 22. Alternatively, the bearing 6 is configured without an inner ring, so that the rollers 20 run on the shaft 2. The bearing 8 comprises the bearing ring 10, balls 23, a cage 24 and two inner rings 16 and 25. The shaft 2 is mounted rotatably in relation to the housing 3, 4 by means of the bearing assembly 1. Alternatively, the housing 3, 4 is mounted rotatably in relation to the shaft 2 by means of the bearing assembly.

Figure 4:
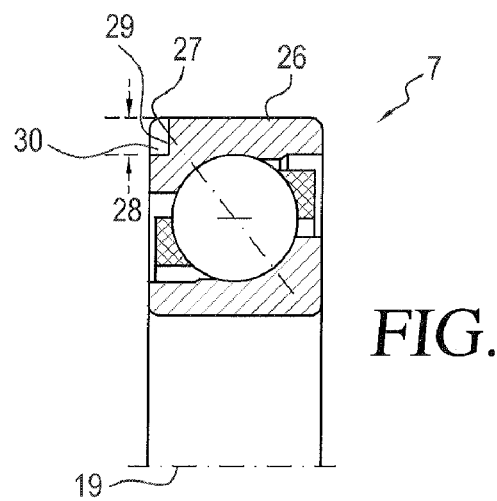

FIG. 4 shows an exemplary embodiment of an axial support 7 in the form of an angular ball bearing. The outer bearing ring 26 is provided with a holding groove 27, in which a flat key 28 (only indicated) engages. The holding groove 27 has a side wall 29, aligned perpendicularly in relation to the axis of rotation 19 and facing the axial direction, and two side walls 30, lying opposite each other transversely in relation to the axial direction and aligned parallel to each other. By means of the flat key 28, a form-locking rotational securement with a radial support (not represented) can be produced.

Figure 5:
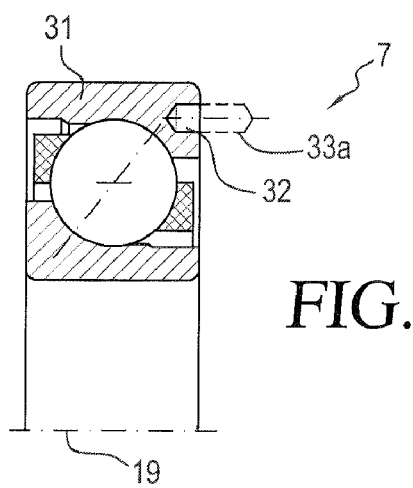

The bearing ring 31 of an axial support 7 as shown in FIG. 5, formed as an angular ball bearing, has an axial bore 32. Engaging in the axial bore 32 is an only indicated pin 33a, by means of which the bearing ring 31 is connected in a form-locking manner to a bearing ring (not represented) of a radial support in the circumferential direction in the axis of rotation 19.

Figure 6:
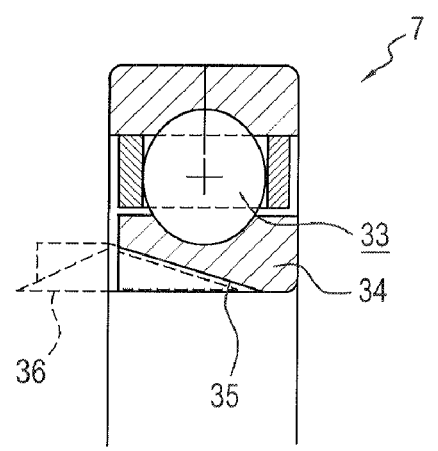

A deep groove ball bearing 33, designed as an axial support 7, is represented in FIG. 6. The inner bearing ring 34 of the deep groove ball bearing is provided with a key groove 35. A key 36 engaging in the key groove 35 engages in a form-locking manner in a corresponding clearance on an inner ring of a radial support (not represented), so that the supports are in this case coupled to each other by means of the inner rings.

DESIGNATIONS 1 bearing assembly
2 shaft
3 housing
3a housing part
3b housing part
4 housing
5 radial support
6 bearing
7 axial support
8 bearing
9 bearing ring
10 bearing ring
11 bore
11a portion
11b portion
12 air gap
13 connecting element
14 Woodruff key
15 holding groove
16 inner ring
17 side wall
18 side wall
19 axis of rotation
20 roller
21 cage
22 inner ring
23 ball
24 cage
25 inner ring
26 bearing ring
27 holding groove
28 flat key
29 side wall
30 side wall
31 bearing ring
32 axial bore
33 deep groove ball bearing
33a pin
34 bearing ring
35 key groove
36 key

The invention claimed is:

1. A bearing assembly comprising: at least one first bearing as an axially free radial support, at least one second bearing as a radially free axial support; the first bearing and second having a common axis of rotation, at least a first bearing ring of the first bearing and a second bearing ring of the second bearing being rotationally fixed in relation to at least one bearing seat, wherein the first bearing ring and the second bearing ring lie axially opposite each other and the second bearing ring is coupled with the first bearing ring, contactlessly in relation to the bearing seat, in a locking and rotationally fixed manner by means of at least one connecting element engaging in a locking manner in at least one corresponding clearance on the first bearing ring or the second bearing ring, the connecting element is formed separately from the first bearing ring and from the second bearing ring, and engages at least axially in one clearance respectively on the first bearing ring and on the second bearing ring.

2. The bearing assembly as claimed in claim 1, wherein the connecting element is a Woodruff key, the Woodruff key engaging radially and axially in the clearances.

3. The bearing assembly as claimed in claim 1, wherein the bearing seat is a housing, the first bearing ring being fixed on the housing.

4. The bearing assembly as claimed in claim 3, wherein the bearing seat is a bore in the housing, the first bearing ring being accommodated in the bore in a rotationally fixed manner in relation to the housing.

5. The bearing assembly as claimed in claim 3, wherein the first bearing ring and the second bearing ring are at least partially engaged around by the housing, the first bearing ring being fixed seated in a bore and that the second bearing ring is surrounded circumferentially on the outside by a radial air gap between the housing and the second bearing ring.

6. The bearing assembly as claimed in claim 5, wherein the first bearing ring and the second bearing ring axially enter the bore at least partially and the bore is thereby described at least around the first bearing ring and around the second bearing ring by an inside diameter that is the same throughout.

7. The bearing assembly as claimed in claim 5, wherein the first bearing ring and the second bearing ring axially enter the bore at least partially and the bore is thereby axially divided at least into a first portion and a second portion, the portions having inside diameters that are different from each other and the first portion running at least partially around the first bearing ring and the second bearing ring thereby arranged outside the first portion and radially separated from the second portion by the air gap.

8. The bearing assembly as claimed in claim 1, wherein the first bearing and the second bearing are rolling bearings with rolling bodies.

* * * * *